United States Patent Office 3,482,008
Patented Dec. 2, 1969

3,482,008
COMBUSTION PROCESS OF PREPARING A
COLORED STRUCTURAL ARTICLE
Henry J. Hibshman, Plainfield, N.J., assignor to Esso
Research and Engineering Company, a corporation of
Delaware
No Drawing. Filed July 17, 1964, Ser. No. 383,494
Int. Cl. B29c 25/00; B44c 1/22
U.S. Cl. 264—80                                     7 Claims

ABSTRACT OF THE DISCLOSURE

Process for producing articles of manufacture having at least one colored, decorative surface formed from aggregate and a bituminous binder which comprises compacting the mixture into a structural element, curing the compacted form at a temperature in the range from 250° F. to 500° F. and thereafter exposing the cured element to an oxidizing flame having a temperature in the range of from about 1200° F. to about 2400° F.

---

The present invention is concerned with solid compositions produced from finely divided aggregate and a binder such as a petroleum residue and with a process of manufacture of these compositions and with the shaped articles of manufacture comprising these compositions. In particular, the invention is concerned with producing such articles of manufacture having at least one colored decorative surface and a process for making such colored articles.

In the process of the present invention, the binder which is initially a fluid, semifluid or plastic oil-soluble material is converted into an oil insoluble, infusible carbonaceous bond. The solid compositions of the present invention are dense, rock-like compositions characterized by having superior, creep-resistant properties, freeze-thaw-resistant properties, fire-resistant properties, solvent-resistant properties, properties of water impenetrability and a property of having at least one surface of a desired color. The solid compositions of the present invention are characterized by having uniform precision of dimensions, are nonporous, are very smooth and have at least one surface of a desired color.

The stabilization of soil and other particulate solids by petroleum binders, particularly for use in construction, has not hitherto enjoyed commercial success. A very limited number of houses in which sandy clay-type soils in conjunction with asphalt have been used to form building blocks has been built in the United States. In making these blocks, asphalt was applied to the soil as a water emulsion of an asphalt cutback solution in a naphtha. The mixture was then hand tamped generally in wooden molds and the blocks sun cured for several weeks. The asphalt functioned mainly as a waterproofing agent rather than as a binder, since the asphalt increased the wet strength of the soil but did not appreciably increase dry strength. In this process, it was considered essential to wet the soil with water before mixing it with the asphalt cutback or the asphalt emulsion. The water deflocculated the clay aggregate and served as a compaction lubricant.

It was found that building blocks produced by this prior art method and the composition thereof gave maximum unconfined wet compressive strengths at about 3 to 8 wt. percent asphalt, depending upon the type of soil used, but failed to approach the compressive and tensile strength of commercially available concrete blocks and brick. Despite their low unit strength, these materials were of some limited use in arid or semiarid regions in the form of thick, solid blocks where economic factors favored their use in certain types of construction. These blocks were wholly unsuitable in other geographical regions where there was a significant variation in humidity or where these building materials would contact moisture. Thus, besides very low compressive and tensile strength necessitating the use of thick solid blocks for adequate strength, the prior art asphalt-stabilized soil compositions could not be used in home construction, even in solid block form, where there was water contact or a variation in the humidity of the air, without a subsequent exterior coating. Thus, these prior art materials could not be employed, for example, below grade or at footing levels. A further disadvantage of these prior art materials was the poor adhesion characteristics of exterior finishes such as paint, mortar, stucco and the like to the exterior surface of the blocks. The blocks apparently expanded and contracted in response to small changes in the humidity of the air, resulting in extensive cracking and peeling of exterior coatings.

It has been found that if the soil to be stabilized is uniformly and thinly coated with a solvent cutback asphalt, maximum wet and dry compressive strengths are generally obtained at more than 8 wt. percent asphalt on a sandy clay soil. It has further been discovered, contrary to the prior art, that the presence of water as a compaction lubricant not only is not essential, but is actually detrimental to compressive strength. The employment of certain amounts in the range of 3 to 30 wt. percent of a cutback asphalt with soils containing no moisture or only small amounts of moisture allows solids to be compacted to high densities with both wet and dry compressive strengths exceeding the strength of commercially available nonmetallic building materials, while also allowing a wider range of soil types to be used. Additionally, these soils or other compacted finely divided solids or aggregates are substantially waterproof and do not significantly absorb water or tend to expand in the presence of moisture. Further, the stabilized soil compositions of the invention can be used in any climate or geographical area either above or below grade level and require only decorative finish. Ordinary house paints and other exterior coatings adhere well to the exterior surface and there is litle or no tendency for the binder to bleed into the paint or exterior coating.

Thus, in accordance with the present invention, 3 to 30 wt. percent, preferably 8 to 30 wt. percent of a bituminous binder such as asphalt is mixed with a subdivided solid or finely divided aggregate. The mixture is then compressed to a density of about 70 to 98%, preferably to a density of about 80 to 98% and more preferably 80 to 95%, based upon the theoretical density. The compressed product is then heat cured at a temperature in the range from 250° to 550° F., preferably from 300° to 500° F., for a period of time from about 1 hour to 10 days, preferably from about 4 hours to 80 hours and most preferably from 8 hours to 24 hours. The block is then exposed to an oxidizing flame for from about 1 second to a time sufficient to expose the colored surface. The preferred time is from about 2 to 600 seconds. The heat curing and treatment with the oxidizing flame steps can be combined.

In the present invention there can be used as binders the known family of materials commonly referred to as asphalts, such as natural or petroleum residua of themoplastic, solid or semisolid consistency at ambient temperatures, normally of brown to black cementitious material in which the predominating constituents are bitumens. The bituminous material to be used may be selected from a wide variety of natural and industrial products. For instance, various natural asphalts may be used such as natural Trinidad, Gilsonite, Grahamite and Cuban asphalts. Petroleum asphalts suitable for the purposes of this invention include those asphalts obtained from California crude, from tar sands, Venezuelan or Mexican petroleum asphalt, or Middle East or a Mid-Continent airblown oil and the like, or combinations thereof. Petroleum asphalts also include those asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products from the chemical refining such as oxidation of high molecular weight hydrocarbons, those asphalts obtained from hydrogenated coal products, the asphaltic material obtained in the thermal or catalytic cracking of petroleum to obtain gasoline or other light fractions or any combination of these materials.

Petroleum asphalts are generally prepared from petroleum residual oils obtained by the distillation of an asphaltic or semiasphaltic crude oil or thermal tar or by the fluxing of harder residual asphalts with heavy petroleum distillates. Such residual oils are high boiling liquids or semi-solids which may have softening points from about 32° F. to about 120° F. and are generally characterized by specific gravities ranging from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending or solvent deasphalting of residual oils. These operations remove a significant quantity of the lower boiling, more volatile material present in the residual oils and result in a product having a softening point between about 100° F. and about 170° F., although higher softening points can be obtained by more extensive treatment.

Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. Both straight reduced asphalts and oxidized asphalts are useful in the invention.

Although the petroleum asphalts are preferred, other suitable bituminous material would include coal tar, wood tar, and pitches from various industrial processes. The invention can also be successfully practiced with chemically modified asphalts such as halogenated, e.g., chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed with minor amounts, e.g., 1 to 10 wt. percent, of other natural and synthetic thermoplastics and thermosetting materials like rubbers, resins, polymers and elastomers, of an oily, resinous or rubbery nature. Nonlimiting examples of suitable materials include polyolefins, polypropylene, polyethylene, polyisobutylene, polymers from steam cracked naphthas and the like; natural or synthetic rubber-like butyl rubber, halogenated butyl rubber, polydienes like polybutadiene, elastomeric copolymers of styrene and butadiene, copolymers of ethylene and propylene and the like; epoxy resins; polyalkylene oxides; natural and synthetic waxes; polyvinyl acetates; phenol aldehyde condensation products; and the like and combinations thereof.

Furthermore, in a modification wherein the asphalt is chemically modified by reaction with liquid reagents, for example, $CCl_4$, the reagent liquid can often be used as the asphalt solvent, whereupon the desired reaction occurs before, during or after the compaction of the soil-asphalt cutback mixture, or during or after the curing step, or the reaction may occur continuously during both finishing process steps.

Satisfactory asphalts, for example, are those designated in the trade as fluxes, binders and various oxidized asphalts. Data on some typical suitable asphalts are shown below:

| Asphalt | Softening Point, °F. | Penetration at 77° F. |
|---|---|---|
| Flux A | <75 | >300 |
| Binder C | 113 | 85–100 |
| Oxidized Asphalt 1 | 180–200 | 24 |
| Oxidized Asphalt 2 | 200–235 | 18 |

Also, bitumen subjected to any of the commonly used petroleum or refining and treating processes such as distillation, steam reduction, solvent separation or blending, and the like can be employed. The invention is of particular value with oxidized asphalts, for example, those asphalts prepared by air blowing or chemically oxidizing asphaltic residua at elevated temperatures (400° to 500° F.) with or without the presence of catalytic agents, such as compounds of phosphorus (like phosphorus pentoxide) or of the transition metals (like ferric chloride). These oxidized asphalts commonly have ATSM softening points of at least 100° F., e.g., 100° to 300° F., or higher. These asphalts and especially those oxidized asphalts and straight reduced asphalts having an ASTM softening point of 200° F. and above and an ASTM D–5 penetration at 77° F. of 100 or below, which excludes fluxes, are some of the preferred asphalts of the invention.

In one aspect of the present invention, the foregoing bituminous materials are employed in a volatile organic cutback solvent such as a petroleum naphtha or other solvent boiling within the range of about 175° to 600° F., e.g., 200° to 400° F. The cutback solvent should preferably be one that is sufficiently volatile to be substantially volatilized during the selected curing step. i.e., a solvent having a boiling point of less than 600° F. or advantageously less than 400° F. Suitable asphalt concentrations in the cutback solution are from 30 to 90 wt. percent asphalt, for example, 50 to 75 wt. percent. Preferably, the Furol viscosity at the temperature at which the cutback is applied should be 100 or less, e.g., 20 to 100 Furol. Suitable cutback solvents would thus include, but are not limited to, hydrocarbons such as toluene, benzene, xylene, mineral spirits, varnish makers' and painters' naphtha, Stoddard solvent, kerosene, halohydrocarbons such as carbon tetrachloride and methylene dichloride or any combinations thereof.

The cutback asphalt compositions may contain other additive agents such as wetting and emulsifying agents and antistripping agents. The asphalt cutback should be used in an amount sufficient to provide at least 5, preferably 8 to about 30 wt. percent asphalt, or higher, based on the soil or finely divided aggregate. Maximum compressive strengths are usually attained with cutback asphalt at 10 to 20, e.g., 12 to 16 wt. percent asphalt. The amount and character of the cutback solvent should be such that the cutback composition will have the proper coating viscosity.

The stabilized solid compositions of this invention, prior to molding, comprise a dry subdivided solid material or finely divided aggregate of a particular size distribution and a bituminous binder, for example, a high softening point asphalt binder. Thus, one process of the present invention of forming solid structures of high compressive strength comprises thoroughly mixing the dry subdivided solid material with an asphalt binder cutback composition to provide a relatively thin uniform coating of the binder composition on the solid particles; evaporating the solvent from the solid binder composition to obtain a substantially dry pulverulent solid mixture containing from about 3 to 30 wt. percent, preferably from about 8 to 30 wt. percent asphalt and small amounts of solvent so that the penetration values (ASTM D–5, 100 g., 5 secs.) of the asphalt-solvent mixture lie in the range of from 20 to +335 mm./10; compacting the dry solid mixture to the desired density or shape; and curing the compacted mass.

Thus, the solid material of the stabilized compositions is any dry inorganic or organic comminuted solid material, with earth and soil the preferred solid materials for the production of hard dense structures useful in building construction. The solid aggregate material may comprise combinations of materials of natural or synthetic origin with or without the presence of clay-type soils. For example, suitable combinations include 10 to 60% clay with iron ore fines or other material ranging from 1 to 40%; e.g., 5 to 25%, of the clay-material combination. Suitable nonlimiting examples of other aggregate materials include finely subdivided cinder, expanded slag or clay, rock wool, steel wool, abrasives, expanded clays, cellulose fibers, sawdust, cane fibers, bagasse, hemp, jute, coke, iron ore, diatomaceous earths, clays, soil, silt, coal, asbestos, glass fibers, wood chips, quartz, carbonate rocks, volcanic ash, bamboo, and the like and any combination thereof. The cellulosic and fibrous materials are suitable for use in combination with mineral materials.

Although the presence of clay under certain conditions is essential for high strength asphalt-soil structures, non-soil solids do not require the presence of clay. With non-soil structures, the largest particles to be employed should normally not exceed one-third of the smallest dimension of the object to be formed. With small nonsoil objects, a particle size distribution similar to that of soil is preferred.

Thus, a wide variety of solids can be used in conjunction with the asphalt binder to form high-strength structures. In general, minerals are the preferred solids especially those which have well defined crystal shapes and in particular those crystals which are readily compacted to low voids-content structures. For example, kaolinite, chlorite, talc, mica, specular hematite which crystallize as plates or discs are readily compacted with asphalt to produce high-strength structures. Asbestos, which has a fibrous structure, and attapulgite, which crystallizes as needles, are less readily compacted.

As is well-known, finely divided solids are more readily compacted to give nonporous structures than coarse. Clays and clay soils are examples of finely divided solids occurring in nature. By the process of the invention they can be used to prepare high-strength structures. All types of clay soils can be used, ranging from practically 100% clay content to those with low clay content, if the structure will not be exposed to water. If the structure is to be exposed to water it is essential that the amount of the so-called expanding clays be kept at low levels, and generally below 10%, preferably below 5%. The expanding clays are those which swell in the presence of water or other small polar molecules, and include the montmorillonites (bentonites), vermiculite and "open-end" illite. Although these clays with asphalt have high dry strength they disintegrate in the presence of water. For use in the presence of water the soil also should not contain appreciable amounts of organic matter or water-soluble salts.

In order to waterproof clay soils with asphalt it is necessary to cover the particles with a thin layer of asphalt. Since the surface area of finely divided solids is high, it is not unexpected that larger amounts of asphalt would be needed to provide a protective layer on high clay-content soils. For economic reasons therefore it is desirable to use relatively low clay-content soils in asphalt-soil block manufacture. A very satisfactory soil is one which contains about 20 to 25% clay, the remainder being silt and sand. With this soil, 8 to 12% asphalt by weight on the soil will provide high strength and adequate water repellency. It will be obvious that sandy, silty and clayey soils can be blended to achieve the desired particle size distribution.

With some soils and minerals it is possible to obtain high strength with little or no clay or finely divided particles (below 5μ) present. In these, as mentioned previously, the coarse particles are present as crystals of nearly equidimensional size (plates, discs, prisms, etc.) which are easily compacted to low void content structures. When the coarser particles are not of this type, as found in sand and some silts, the strength of the asphalt-soil blocks will be somewhat lower but may be adequate for applications where high loads will not be applied such as in one-story dwellings.

The particle size of soils is ordinarily determined by ASTM Method D–422–54T. In this procedure particle size is calculated from the rate of settling in a water suspension. Although clay soils form agglomerates and aggregates of the primary soil particles, they are largely broken up by water. It is thus possible to have a soil which appears to be very coarse on the basis of a dry screen analysis but which shows a high clay content in the ASTM D–422–54T grain size analysis. On mixing the soil with asphalt, these agglomerates or aggregates are partially permeated by asphalt and to some extent they are disintegrated into finer particles which are coated by asphalt. Coverage is not complete, however, and one obtains a nonuniform structure which may have low strength and high water sensitivity. It is essential, therefore, that the large agglomerates be broken up by light grinding or other means approaching as a limit the same state of subdivision as indicated by ASTM D–422–54T before mixing with the asphalt.

Over-all, soils in which kaolin is the chief clay constituent are preferred for block making. Not only is kaolin of the proper crystal shape for easy compaction but it is readily wetted by asphalt and the asphalt is not as easily displaced by water as with some other clays. There is some evidence also that agglomerates and aggregates of kaolin are broken up during simple mixing with asphalt and accordingly the amount of preliminary crushing is reduced and coverage is more complete.

It has now been found that the blocks made by the foregoing known processes can be made so as to have at least one highly colored permanent surface. Blocks made from a mixture of an aggregate and bituminous binder are normally black in color. This is very unsatisfactory for certain building purposes. Painting the blocks can impart color to their surfaces. However, for certain purposes, the building materials are desired to have a permanently colored surface. It has now been found that a block having at least one permanently colored surface can be made by mixing an aggregate which is colored with the binder and then burning the binder from the surface of the block. Particles of sand, rock, rock dust and clay soils are mixed with a binder and pressed into shape according to the foregoing process. The rock dust and clay soils can be dyed or mixed with pigment to give a desired color. The aggregate is mixed with the binder, placed into molds, pressed into the desired shape and then cured at a temperature of from 300° to 600° F. for from 6 to 20 hours. After the blocks are cured, they are then exposed to an oxidizing flame. The oxidizing flame burns the binder from the surface of the block thereby exposing the aggregate. The depth to which the aggregate is burned out by the oxidizing flame is dependent upon the amount of time of burning and the temperature of the oxidizing flame. The colored surface of the brick contrary to expectation did not crumble or brush away, but was, in fact, a hard, smooth surface having the color of the aggregate particles.

The oxidizing flame of the instant invention can be a flame such as oxygen-enriched natural gas or other oxygen-enriched fuel gases. The temperature of the flame should be in the range of from about 1200° to about 2400° F. The time of contact for the brick with the oxidizing flame should be in the range of from about 2 seconds to 180 seconds. Depending upon the contact time, the depth of the burnout can vary from a fine layer up to a quarter of an inch in depth.

The building materials can be exposed to the oxidizing flame either by packing the materials into a furnace or by conveying them upon a conveyor belt under an oxidizing flame. In another embodiment of this invention, the building materials after being exposed to the oxidizing flame can be coated with a glazing material and then subjected to an increased temperature thereby producing a glazed surface which will be hard and smooth. Materials made in this way then can be used as tile or decorative building materials.

The following examples are presented to more clearly set forth applicant's invention and are not deemed to limit the invention as set forth in the appended claims.

EXAMPLE 1

White sand was compacted with 12 wt. percent asphalt based upon the sand and then compacted into a rectangular block at a pressure of about 4500 p.s.i.g. The resulting block was then heated at a temperature of 375° F. for 16 hours. The block was then exposed to an oxygen-enriched natural gas flame for 5 seconds. The block was then examined and tested for structural strength. Examination showed that the base of the block exposed to the oxidizing flame was white in color to a depth of about ⅛ of an inch. The structural strength of the block was substantially the same after being exposed to the oxidizing flame as it was prior. The white surface of the block was relatively smooth, compact and hard. No crumbling or weakness of the surface was found to exist.

EXAMPLE 2

A number of portions of colored stone dust was dyed with chemical dyes to different colors. The dyed materials were each mixed with cutback asphalt and pressed into rectangular solids at a pressure of about 5,000 p.s.i.g. and cured at about 400° F. for 12 hours. The cured blocks were thereafter exposed to an oxidizing flame comprising oxygen-enriched natural gas for times varying from 3 to 6 seconds. The resulting blocks each had a colored surface corresponding to the color of the dyed aggregate. All of the blocks were tested for structural strength and were found to have substantially the same strength as blocks which were not exposed to the oxidizing flame. All the surfaces were firm, smooth and did not crumble.

EXAMPLE 3

The blocks produced in Example 2 were coated with a glazing material upon the colored side and then exposed to a temperature sufficient to produce glazing. After being subjected to the heat glazing, the blocks were tested and found to have an ultrasmooth surface. The glazed surface of the blocks was strongly adhered to the remaining portion of the block and was of the color of the original dyed aggregate.

What is claimed is:
1. A process of preparing a colored structural element of high compressive and tensile strength which comprises intimately admixing a finely divided colored aggregate with a bituminous binder, said binder being present in the resulting mixture in an amount in the range of 3 to 30 wt. percent based on the aggregate, compacting said admixture into the form of said structural element by applying to said form a compaction pressure to secure a theoretical density in the range from about 80% to about 95% and then curing the compacted form at a temperature in the range of about 250° to 500° F. for a time in the period of from about 6 to 20 hours and then exposing the said structural element to an oxidizing flame having a temperature in the range of from about 1200° F. to about 2400° F. for from about 2 seconds to 600 seconds to produce a structural element having a colored surface.

2. A process as in claim 1 wherein the colored structural element is coated with a glazing solution on its colored face and then heat treated so as to glaze said colored surface.

3. A process of preparing a colored structural element of high compressive and tensile strength which comprises intimately admixing finely divided white sand with 12 wt. percent asphalt based on the sand, compacting said admixture at a pressure of about 4500 p.s.i.g., curing the resulting block at a temperature of 375° F. for 16 hours and then exposing said block to an oxygen-enriched natural gas flame having a temperature in the range of from about 1200° F. to about 2400° F. for 5 seconds thereby producing a block having a white surface.

4. A process of preparing a colored structural element of high compressive and tensile strength which comprises intimately admixing finely divided stone dust treated with chemical dyes with cutback asphalt, pressing the admixture into longitudinal solids at a pressure of about 5,000 p.s.i.g., curing said solids at a temperature of about 400° F. for 12 hours, and then exposing the said block to an oxygen-enriched natural gas flame having a temperature in the range of from about 1200° F. to about 2400° F. for 3 to 6 seconds thereby producing a block having a colored surface.

5. Process as defined by claim 1 wherein said flame is an oxygen-enriched flame.

6. Process as defined by claim 1 wherein said structural element is compacted to secure a theoretical density in the range from about 80% to 95% and wherein said finely divided colored aggregate consists essentially of white sand.

7. Process as defined by claim 1 wherein said structural element is compacted to secure a theoretical density in the range from about 80% to 95% and wherein said finely divided colored aggregate consists essentially of iron ore fines.

References Cited

UNITED STATES PATENTS

| | | | |
|---|---|---|---|
| 520,868 | 6/1894 | Strusholm | 264—66 |
| 873,568 | 12/1907 | Magoon | 264—65 |
| 2,057,349 | 10/1936 | Rentschler | 264—59 |
| 1,158,417 | 10/1915 | Dennison | 264—80 |
| 1,862,066 | 6/1932 | Skillin | 264—80 |
| 2,337,337 | 12/1943 | McCluer et al. | 106—281 |
| 3,243,311 | 3/1966 | Rogers et al. | 106—281 |
| 3,287,146 | 11/1966 | Rogers et al. | 106—281 |

DONALD J. ARNOLD, Primary Examiner

U.S. Cl. X.R.

106—281; 117—46; 264—62, 66